United States Patent
Lakkis

(10) Patent No.: US 8,422,468 B2
(45) Date of Patent: Apr. 16, 2013

(54) COMMON-MODE PARTITIONING OF WIDEBAND CHANNELS

(75) Inventor: Ismail Lakkis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 777 days.

(21) Appl. No.: 12/419,198

(22) Filed: Apr. 6, 2009

(65) Prior Publication Data

US 2010/0054199 A1 Mar. 4, 2010

Related U.S. Application Data

(60) Provisional application No. 61/092,613, filed on Aug. 28, 2008.

(51) Int. Cl.
*H04Q 7/24* (2006.01)
*H04L 12/56* (2006.01)

(52) U.S. Cl.
USPC ......... 370/338; 370/329; 370/236.1; 370/386

(58) Field of Classification Search .................. 370/329, 370/236.1, 338, 386
See application file for complete search history.

(56) References Cited

U.S. PATENT DOCUMENTS

| | | | |
|---|---|---|---|
| 2003/0224731 A1 | 12/2003 | Yamaura et al. | |
| 2004/0008617 A1* | 1/2004 | Dabak et al. | 370/208 |
| 2004/0151109 A1* | 8/2004 | Batra et al. | 370/208 |
| 2007/0105548 A1* | 5/2007 | Mohan et al. | 455/426.1 |
| 2007/0168841 A1* | 7/2007 | Lakkis | 714/781 |
| 2009/0232126 A1* | 9/2009 | Cordeiro et al. | 370/350 |
| 2010/0222081 A1* | 9/2010 | Ward et al. | 455/456.3 |
| 2012/0282860 A1* | 11/2012 | Sasai et al. | 455/41.3 |

FOREIGN PATENT DOCUMENTS

| | | |
|---|---|---|
| JP | 2006527538 A | 11/2006 |
| JP | 2007104402 A | 4/2007 |
| JP | 2007325299 A | 12/2007 |
| JP | 2008514058 A | 5/2008 |
| WO | 2008026868 A2 | 3/2008 |

OTHER PUBLICATIONS

Written Opinion—PCT/US2009/055181—International Search Authority European Patent Office—Mar. 29, 2010.
ECMA International: "Standard ECMA-368 High Rate Ultra Wideband PHY and MAC Standard 2nd edition" Internet Citation Dec. 1, 2007, pp. I-VIII,1, XP002563778 Retrieved from the Internet:URL:http://www.ecmainternational.org/publications/files/ECMA-ST/ECMA-368 %202nd%20edition%20December%202007.pdf [retrieved on Jan. 18, 2010].

(Continued)

*Primary Examiner* — John Pezzlo
(74) *Attorney, Agent, or Firm* — Dang M. Vo

(57) ABSTRACT

Certain aspects of the present disclosure relate to a method for allocating a plurality of logical channels within each wideband channel specified by the IEEE 802.15.3c standard. Each logical channel can utilize the same wideband channel, but the logical channel can also utilize a narrowband channel (i.e., a low data rate (LDR) channel) for control and signaling. The logical channel may function as a common mode channel for multi-mode operations. A piconet controller (PNC) within a piconet can utilize the LDR for beaconing, association, and for assigning Channel Time Allocations (CTAs). Inside a CTA period, multiple devices in the piconet can communicate using a single-carrier mode, an OFDM mode, or some other mode.

42 Claims, 11 Drawing Sheets

OTHER PUBLICATIONS

Hiertz G. R., et al., "Multiband OFDM Alliance—The next generation of Wireless Personal Area Networks" Advances in Wired and Wireless Communication, 2005 IEEE/Sarnoff Symposium on Princeton, New Jersey, USA Apr. 18-19, 2005, Piscataway, NJ, USA,IEEE, Apr. 18, 2005, pp. 1-7, XP002329982.

International Search Report—PCT/US2009/055181—International Search Authority, European Patent Office, Mar. 29, 2010.

Part 15.3: Wireless Medium Access Control (MAC) and Physical layer (PHY) Specifications for High Rate Wireless Personal Area Networks (WPANs): Amendment 2: Millimeter-wave based Alternative Physical Layer Extension Draft Amendment to IEEE Standard for Information Technologytelecommunications and Information Exchange Between Systems—Local and Metropolitan Area Networks—Specific Requirements-, vol. IEEE P802.15.3C/D00, Jun. 10, 2008.

Draft Standard for, "High-Rate Wireless Personal Area Networks". IEEE Draft P802.15.3C/D06. Sections 5.5, 12.1.5, 12.1.11, and 12.2.3. 2008.

* cited by examiner

| Channel Number | Low Freq. (GHz) | Center Freq. (GHz) | High Freq. (GHz) | OFDM Chip Rate (MHz) | SC Chip Rate (MHz) |
|---|---|---|---|---|---|
| 1 | 57.240 | 58.320 | 59.400 | 2592 | 1728 |
| 2 | 59.400 | 60.480 | 61.560 | 2592 | 1728 |
| 3 | 61.560 | 62.640 | 63.720 | 2592 | 1728 |
| 4 | 63.720 | 64.800 | 65.880 | 2592 | 1728 |

| $f_0-D_f/2$ | $f_0$ | $f_0+D_f/2$ |
|---|---|---|
| 57240 | 57456 | 57672 |
| 57672 | 57888 | 58104 |
| 58104 | 58320 | 58536 |
| 58536 | 58752 | 58968 |
| 58968 | 59184 | 59400 |
| 59400 | 59616 | 59832 |
| 59832 | 60048 | 60264 |
| 60264 | 60480 | 60696 |
| 60696 | 60912 | 61128 |
| 61128 | 61344 | 61560 |
| 61560 | 61776 | 61992 |
| 61992 | 62208 | 62424 |
| 62424 | 62640 | 62856 |
| 62856 | 63072 | 63288 |
| 63288 | 63504 | 63720 |
| 63720 | 63936 | 64152 |
| 64152 | 64368 | 64584 |
| 64584 | 64800 | 65016 |
| 65016 | 65232 | 65448 |
| 65448 | 65664 | 65880 |

FIG. 7

COMMON-MODE PARTITIONING OF WIDEBAND CHANNELS

CLAIM PRIORITY UNDER 35 U.S.C. §119

The present Application for Patent claims priority to Provisional Application No. 61/092,613 filed Aug. 28, 2008, and assigned to the assignee hereof and hereby expressly incorporated by reference herein.

BACKGROUND

1. Field

Certain aspects of the present disclosure generally relate to a wireless communication and, more particularly, to a method for partitioning wideband channels into common-mode channels for supporting multi-mode operations.

2. Background

An ultra-wideband (UWB) Physical Layer (PHY) can be used for millimeter wave communications (e.g., communications with carrier frequency of approximately 60 GHz). A dual-mode UWB PHY supporting single carrier and Orthogonal Frequency Division Multiplexing (OFDM) modulation can employ a common mode. The common mode is a single-carrier mode used by both single-carrier and OFDM devices for beaconing, network-control signaling, and base-rate data communications. The common mode is typically required for interoperability between different devices and different networks.

The Institute of Electrical and Electronics Engineers (IEEE) 802.15.3 Task Group 3c was formed in March 2005. The IEEE 802.15.3c is intended to support a millimeter-wave-based PHY as an alternative for the existing 802.15.3 Wireless Personal Area Network (WPAN) standard 802.15.3-2003. This millimeter-wave WPAN should operate in the new and clear band including 57-64 GHz unlicensed band specified by the Federal Communications Commission (FCC). The millimeter-wave WPAN should allow high coexistence (i.e., close physical spacing) with all other microwave systems in the 802.15 family of WPANs. In addition, the millimeter-wave WPAN should support high data rate applications (i.e., at least 1 Gbps data rates), such as high speed internet access, streaming video, etc. Very high data rates in excess of 2 Gbps may be provided for simultaneous time dependent applications such as real time multiple High Definition Television (HDTV) video streams.

The IEEE 802.15.3c specification provides for four wideband channels, which allows four piconet controllers (PNCs) to operate concurrently. A wideband channel can be utilized for data communications operated by a specific PNC. On the other hand, no channels are yet specified by the IEEE 802.15.3c standard to be utilized as common mode channels for multi-mode operations.

Therefore, there is a need in the art for a method to introduce common mode channels within the existing IEEE 802.15.3c wideband channels in order to support multi-mode operations.

SUMMARY

Certain aspects provide a method for wireless communications. The method generally includes utilizing a wideband channel for communicating data within a first piconet, wherein the wideband channel is allocated for use by a plurality of piconets comprising the first piconet, and utilizing a narrowband sub-channel encompassed by the wideband channel for communicating control information, wherein the narrowband sub-channel is dedicated for communicating control information in the first piconet.

Certain aspects provide an apparatus for wireless communications. The apparatus generally includes a circuit configured to utilize a wideband channel for communicating data within a first piconet, wherein the wideband channel is allocated for use by a plurality of piconets comprising the first piconet, and a circuit configured to utilize a narrowband sub-channel encompassed by the wideband channel for communicating control information, wherein the narrowband sub-channel is dedicated for communicating control information in the first piconet.

Certain aspects provide an apparatus for wireless communications. The apparatus generally includes means for utilizing a wideband channel for communicating data within a first piconet, wherein the wideband channel is allocated for use by a plurality of piconets comprising the first piconet, and means for utilizing a narrowband sub-channel encompassed by the wideband channel for communicating control information, wherein the narrowband sub-channel is dedicated for communicating control information in the first piconet.

Certain aspects provide a computer-program product for wireless communications. The computer-program product includes a computer-readable medium encoded with instructions executable to utilize a wideband channel for communicating data within a first piconet, wherein the wideband channel is allocated for use by a plurality of piconets comprising the first piconet, and utilize a narrowband sub-channel encompassed by the wideband channel for communicating control information, wherein the narrowband sub-channel is dedicated for communicating control information in the first piconet.

Certain aspects provide an access point. The access point generally includes at least one antenna, a transmitter configured to utilize a wideband channel for transmitting data via the at least one antenna within a first piconet, wherein the wideband channel is allocated for use by a plurality of piconets comprising the first piconet, and a circuit configured to utilize a narrowband sub-channel encompassed by the wideband channel for transmitting control information via the at least one antenna, wherein the narrowband sub-channel is dedicated for communicating control information in the first piconet.

Certain aspects provide an access terminal. The access terminal generally includes at least one antenna, a receiver configured to utilize a wideband channel for receiving data via the at least one antenna within a first piconet, wherein the wideband channel is allocated for use by a plurality of piconets comprising the first piconet, and a circuit configured to utilize a narrowband sub-channel encompassed by the wideband channel for receiving control information via the at least one antenna, wherein the narrowband sub-channel is dedicated for communicating control information in the first piconet.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of frequency allocation of logical channels within a plurality of wideband channels in accordance with certain aspects of the present disclosure.

DETAILED DESCRIPTION

Figure 1:
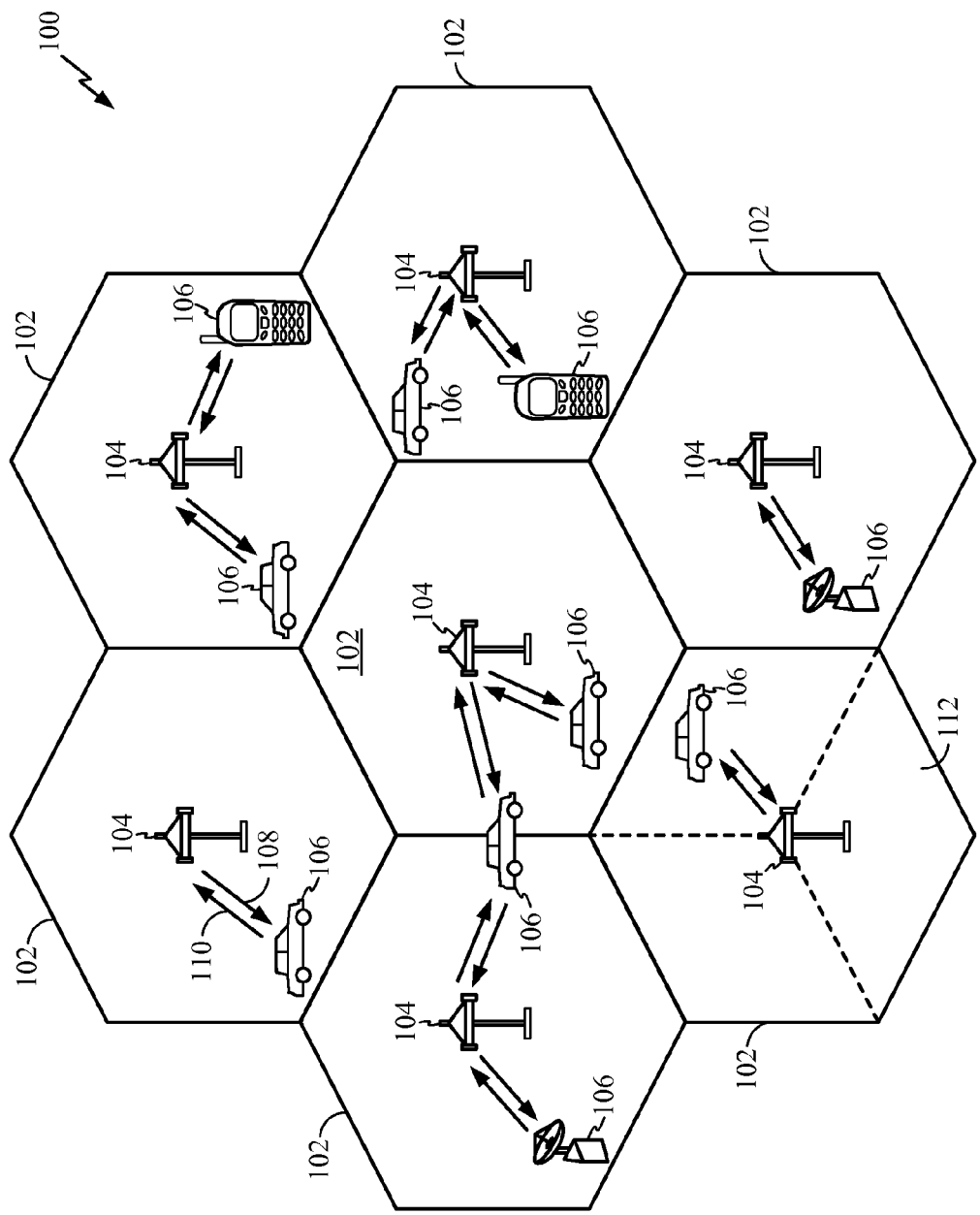
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra Wide Band (UWB) signals including millimeter-wave signals. However, the present disclosure is not intended to be limited to such systems, as other coded signals may benefit from similar advantages.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with UWB techniques. If this is the case, the wireless communication system 100 may be referred to as an UWB system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
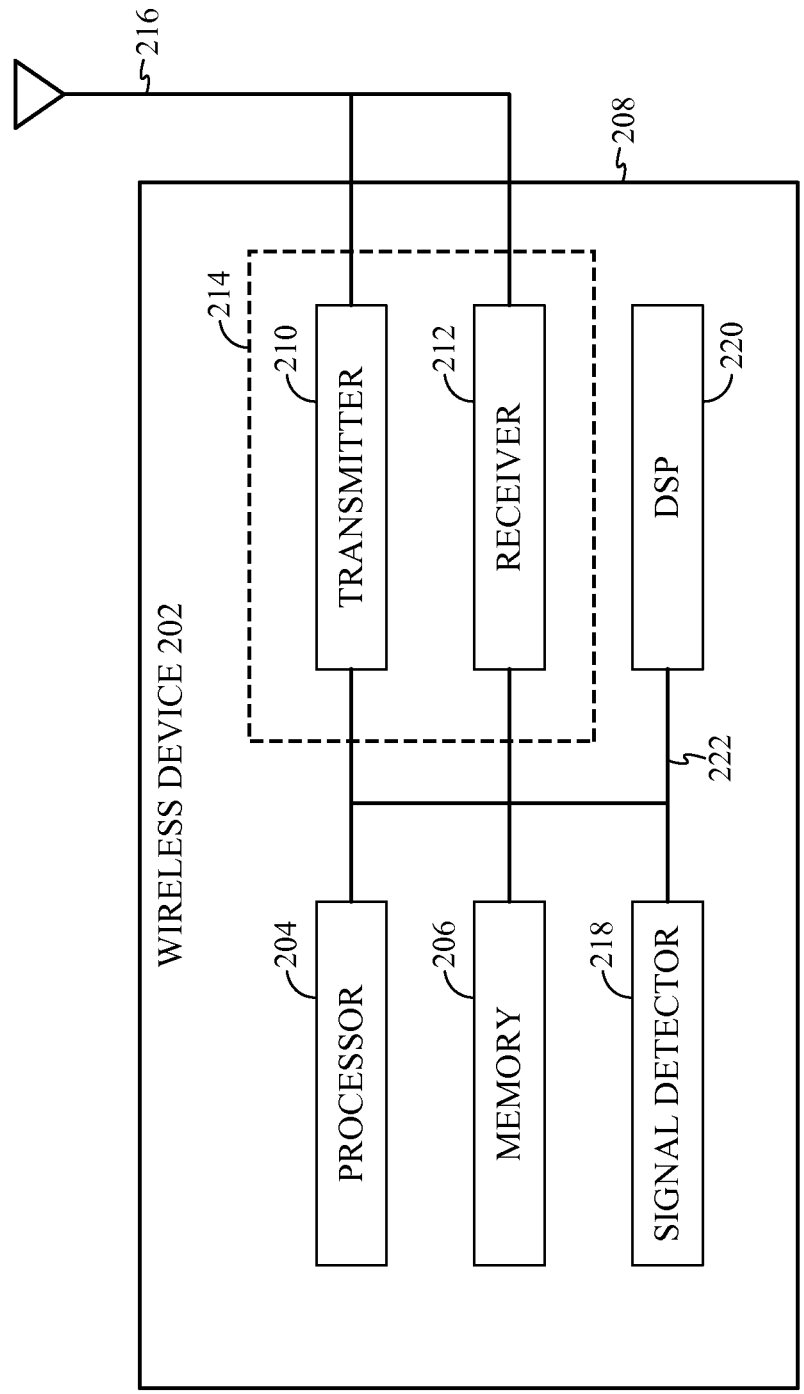
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
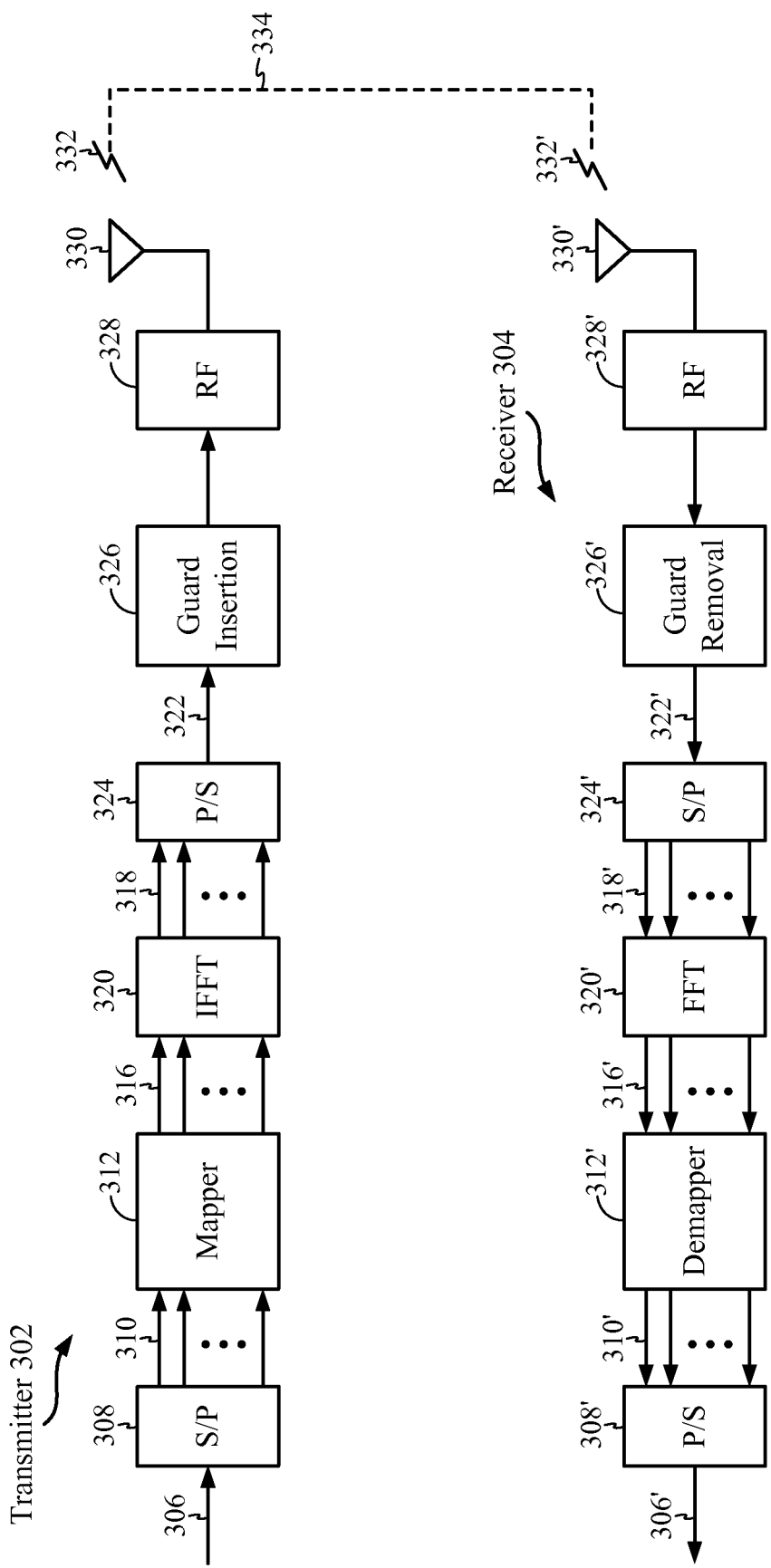
FIG. 3 illustrates an example transmitter and an example receiver that may be used within a wireless communication system in accordance with certain aspects of the present disclosure.

FIG. 3 illustrates an example of a transmitter 302 that may be used within a wireless communication system 100 that utilizes UWB, and Orthogonal Frequency Division Multiplexing or Orthogonal Frequency Division Multiple Access (OFDM/OFDMA). Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, $N_s$, is equal to $N_{cp}$ (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

The wireless system 100 illustrated in FIG. 1 may represent the UWB system supporting the IEEE 802.15.3c standard. The IEEE 802.15.3c specification is intended to support a millimeter wave-based PHY as an alternative for the existing 802.15.3 Wireless Personal Area Network (WPAN) standard 802.15.3-2003. The millimeter-wave WPAN should operate in the new and clear band including 57-64 GHz unlicensed band specified by the Federal Communications Commission (FCC).

Partitioning of Wideband Channels into Logical Channels

Figures 4, 5:
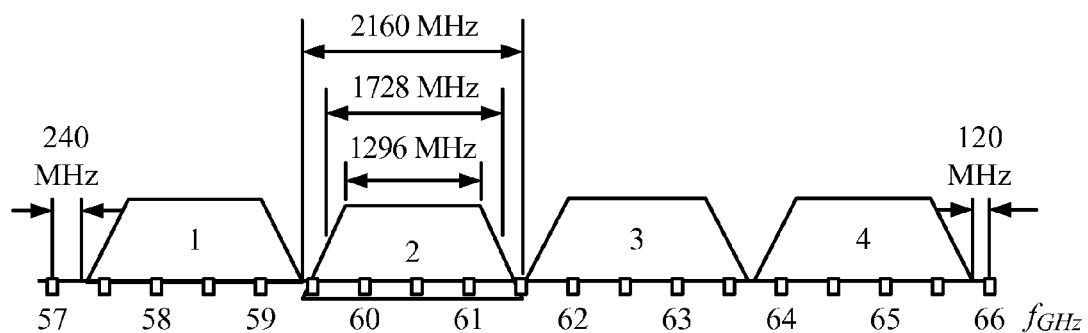
FIG. 4 illustrates low, center and high frequency for each of four wideband channels specified by the IEEE 802.15.3c standard in accordance with certain aspects of the present disclosure.
FIG. 5 illustrates frequency allocations of wideband channels specified by the IEEE 802.15.3c standard in accordance with certain aspects of the present disclosure.

The IEEE 802.15.3c provides for four wideband channels, which allows four piconet networks (i.e., piconets) to operate concurrently. A cell 102 in a wireless system 100 may be an example of a piconet, where a piconet controller (PNC) 104 may communicate with devices 106. FIG. 4 illustrates low, center, and high frequency for each of the four wideband channels specified in the IEEE 802.15.3c standard, and FIG. 5 illustrates particular frequency allocations of these wideband channels. Wideband channels can be utilized for data communications of a plurality of piconets. A wideband channel can be utilized for data communications within a specific piconet. On the other hand, it may be required to specify common mode channels for multi-mode operations within the piconet.

Certain aspects of the present disclosure provide for employing a plurality of logical channels within each wideband channel. A logical channel may utilize the same wideband channel as defined in the IEEE 802.15.3c specification, but it may also utilize a narrowband channel (i.e., a low data rate (LDR) channel) for control and signaling. The logical channel may function as a common mode for a multi-mode operation. For example, a piconet controller (PNC) within a piconet can use the LDR logical channel for beaconing, association, and for assigning Channel Time Allocations (CTAs). Inside a CTA, multiple devices may communicate using a single-carrier mode, an OFDM mode, or any other mode.

Furthermore, during a Contention Access Period (CAP), the LDR may be used for request-to-send (RTS) and for clear-to-send (CTS) messaging between subscriber devices and the PNC. Two devices may communicate with each other within the CTA or within the CAP (e.g., after receiving a CTS message for the PNC in an 802.11-like mode) using a regular wideband channel and using beamforming or directional antennas for spatial reuse.

Figure 6:
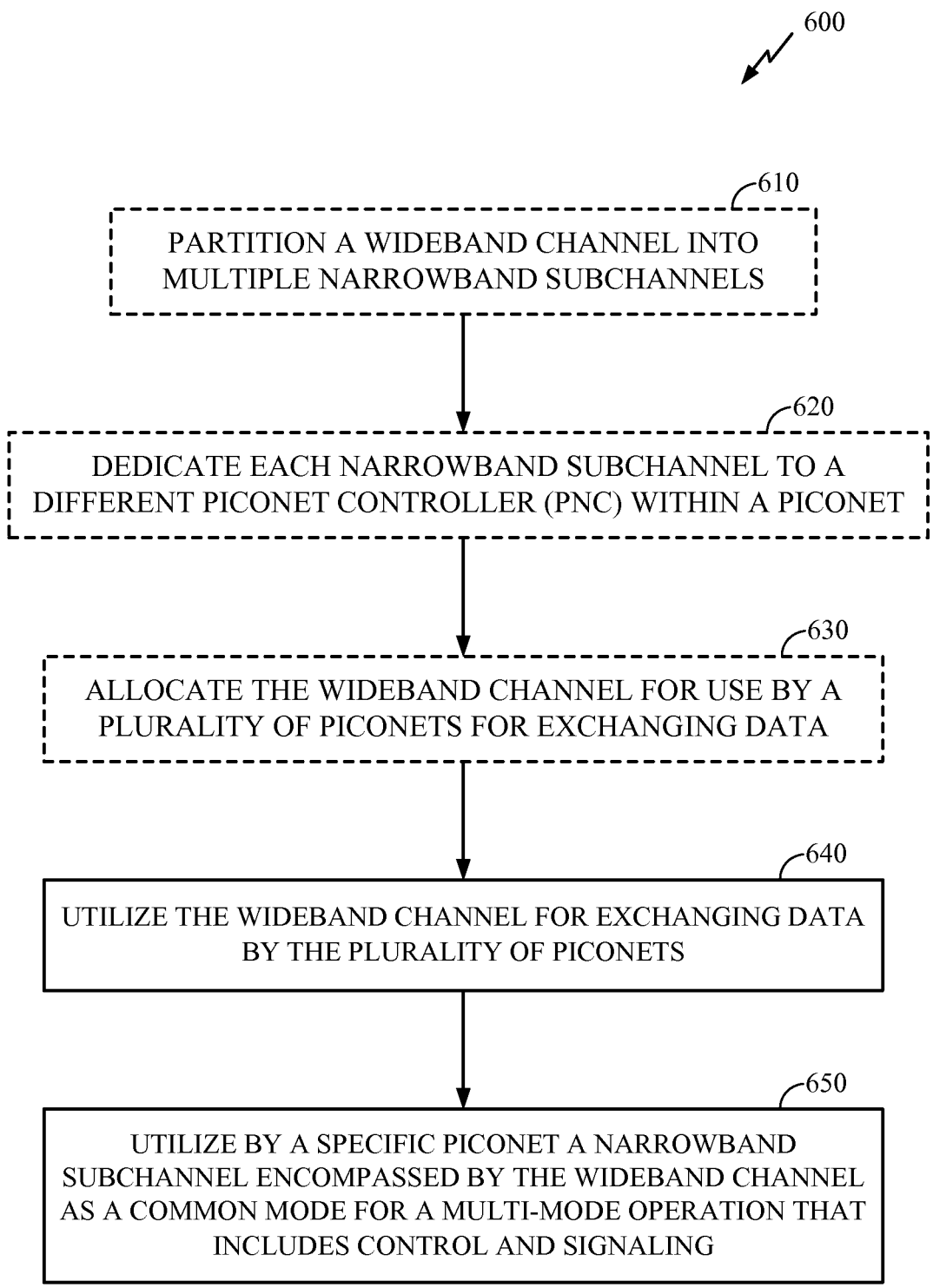
FIG. 6 illustrates example operations for partitioning a wideband channel into narrowband sub-channels and for utilizing narrowband sub-channels in accordance with certain aspects of the present disclosure.

FIG. 6 illustrates example operations 600 for partitioning a wideband channel into narrowband sub-channels and for utilizing narrowband sub-channels. At 610, the wideband channel may be partitioned into multiple narrowband sub-channels. Following that, at 620, each narrowband sub-channel may be dedicated to different PNC within a piconet. On the other hand, the wideband channel may be allocated for use by a plurality of piconets for exchanging data, at 630. At 640, the wideband channel may be utilized for exchanging data by the plurality of piconets. One particular piconet may utilize, at 650, a single narrowband sub-channel encompassed by the wideband channel for the multi-mode operation that may also include control and signaling.

In one aspect of the present disclosure, up to a total of 12 logical channels may be employed across the four wideband channels illustrated in FIGS. 4-5. In another aspect of the present disclosure, up to a total of 20 logical channels may be employed across the four wideband channels. Alternative partitions of the physical channels may be employed without departing from the scope of the present disclosure.

FIG. 7 illustrates a frequency allocation of logical channels in the aspect that employs 20 logical channels. Each wideband channel with a bandwidth of 2160 MHz may be divided into five logical channels, each having a separation of 432 MHz. A central frequency of a logical channel is labeled in FIG. 7 as $f_0$, a lowest frequency is labeled as $f_0-D_f/2$, and a highest frequency is labeled as $f_0+D_f/2$, where $D_f$ is a bandwidth of the logical channel and it is equal to 432 MHz for all exemplary logical channels defined in FIG. 7.

Certain aspects of the present disclosure support a method for assigning one of the four IEEE 802.15.3c wideband channels having a channel separation of 2160 MHz to one particular PNC managing a piconet. Each PNC from a plurality of PNCs may be assigned to one logical narrowband channel from a plurality of logical channels within one wideband channel. In the aspect that employs up to 20 logical channels and four wideband channels, a channel separation between logical channels may be 432 MHz. In this particular case, 3 dB (unit of decibel) bandwidth of the narrowband channel may be approximately 216 MHz, where 3 dB bandwidth is defined as a range of frequencies where a signal power is equal or greater than one half of its maximum value.

Figure 8:
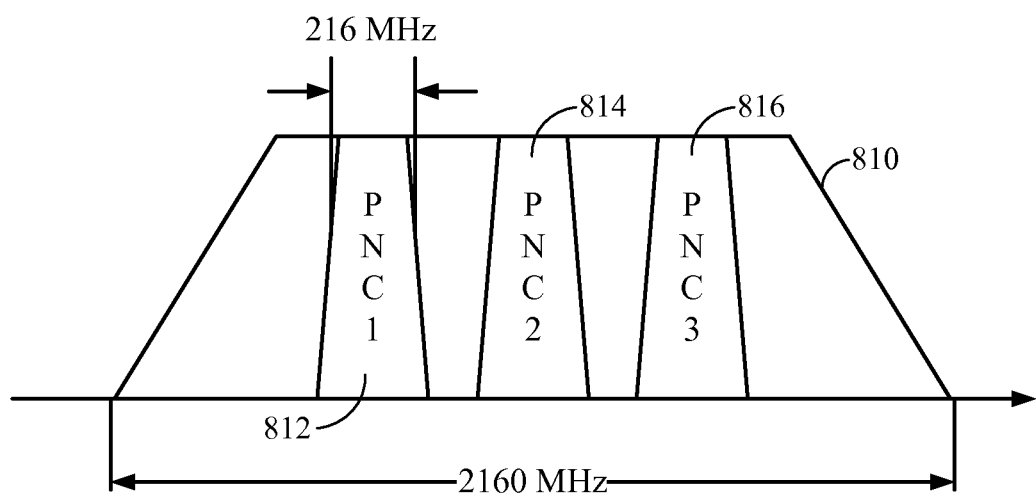
FIG. 8 illustrates an example of frequency allocation for narrowband sub-channels within one wideband channel in accordance with certain aspects of the present disclosure.

FIG. 8 illustrates an example of frequency allocation for three narrowband channels 812, 814, and 816 within one wideband channel 810 from the plurality of wideband channels illustrated in FIG. 5. This particular frequency allocation may allow three different PNCs (i.e., PNC1, PNC2, and PNC3, as illustrated in FIG. 8) to share the same wideband channel and may provide each narrowband channel with the 3 dB bandwidth of 216 MHz in order to facilitate filtering operation.

A PNC in a piconet may employ the LDR channel for beaconing and Media Access Control (MAC) command frames including an association procedure. A subscriber device within the piconet may employ the LDR channel for association, requesting a CTA period, and all signaling with the PNC. A wideband channel may be used within each CTA period for data transmission between two devices or between the PNC and at least one device. Acknowledgements (i.e., ACK signals) may be sent using the wideband channel or the LDR channel. For certain aspects of the present disclosure, a beamforming may be utilized to allow multiple PNCs to employ the same wideband channel via spatial reuse. PNCs using the same wideband channel may employ different LDRs inside the wideband channel in order to avoid interfering with each other.

Format of Low Data Rate Frame

Figure 9A:
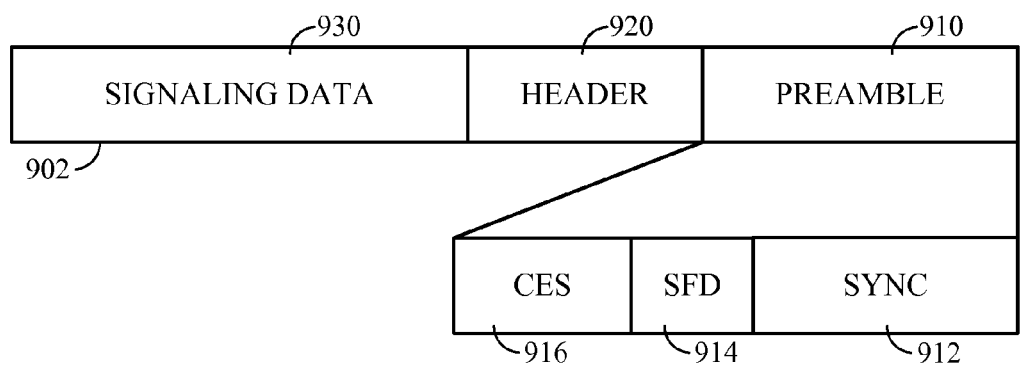
FIGS. 9A-9B illustrate a frame format of a low data rate (LDR) logical channel and a preamble format within the LDR frame, respectively in accordance with certain aspects of the present disclosure.

FIG. 9A illustrates a frame format of a Low Data Rate (LDR) channel. The LDR frame may comprise a preamble 910, a header 920 and signaling data 930. The transmission order of LDR frame components may involve transmitting the preamble sequence first, followed by the header, and then the signaling data.

The preamble 910 may comprise a Channel Estimation Sequence (CES) 916, a Start Frame Delimiter (SFD) sequence 914, and a SYNC (i.e., Synchronization) sequence 912. The transmission order of preamble components may involve transmitting the SYNC first, followed by the SFD, and then the CES. The CES 916 may be used for channel estimation and for fine frequency estimation. The SFD 914 may be used to indicate an end of the SYNC field 912 and a start of the CES field 916. The SYNC field 912 may be used for Automatic Gain Control (AGC), DC-offset removal, packet detection, coarse frequency estimation, antenna switching, direction finding, fine frequency estimation and channel estimation.

Figure 9B:
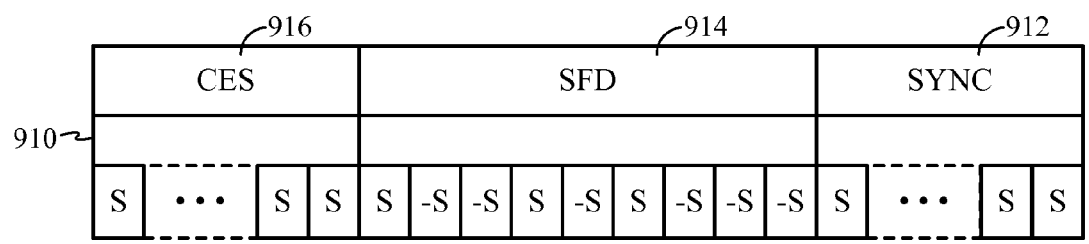

FIG. 9B illustrates a preamble format within the LDR frame 902 illustrated in FIG. 9A. A sequence s with a predetermined length may be chosen such that to permit coherent matched filtering at the receiver with 25 ppm (parts per million units) frequency drift on a transmitter side and with 25 ppm frequency drift on a receiver side.

An exemplary sequence s may be given as:

$$s=[-1 -1 +1 +1 -1 +1 +1 -1 -1 -1 -1 +1 -1 +1 -1 +1 +1 +1 +1]. \quad (1)$$

Figure 10:
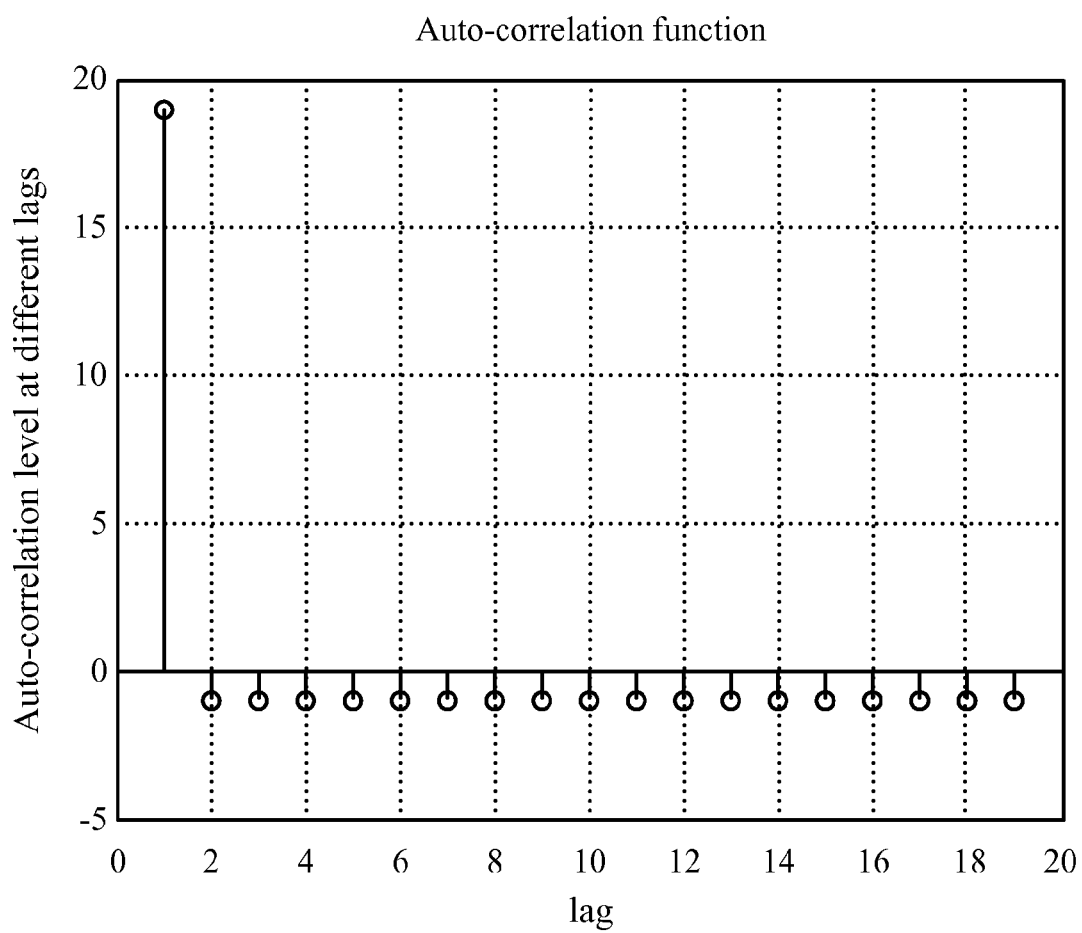
FIG. 10 illustrates an auto-correlation function of the preamble sequence from the LDR frame in accordance with certain aspects of the present disclosure.

A periodic auto-correlation function of the sequence s from equation (1) may have a periodic side-lobe-level of −1, which is illustrated in FIG. 10.

In one aspect of the present disclosure, the sequence s may be further spread with a cover code that may be detected either coherently or differentially. For example, the following cover code may be utilized:

$$c=[-1 -1 +1 -1 +1 +1 +1]. \quad (2)$$

In this particular case, the SYNC field 912 illustrated in FIG. 9B may comprise a repetition of the super-sequence [s −s s −s s s s] of length 19·7=133 samples. The sequence c may be selected such that to provide a quasi-perfect (i.e., almost-zero side-lobe level) periodic auto-correlation function when detected either coherently or differentially.

In one aspect of the present disclosure, the SFD sequence 914 may be provided in order to be accurately detected either coherently or differentially. For example, a length-9 SFD sequence that satisfies these two conditions may be the sequence [−1 −1 −1 +1 −1 +1 −1 −1 +1] spread by the sequences from equation (1).

Figure 11:
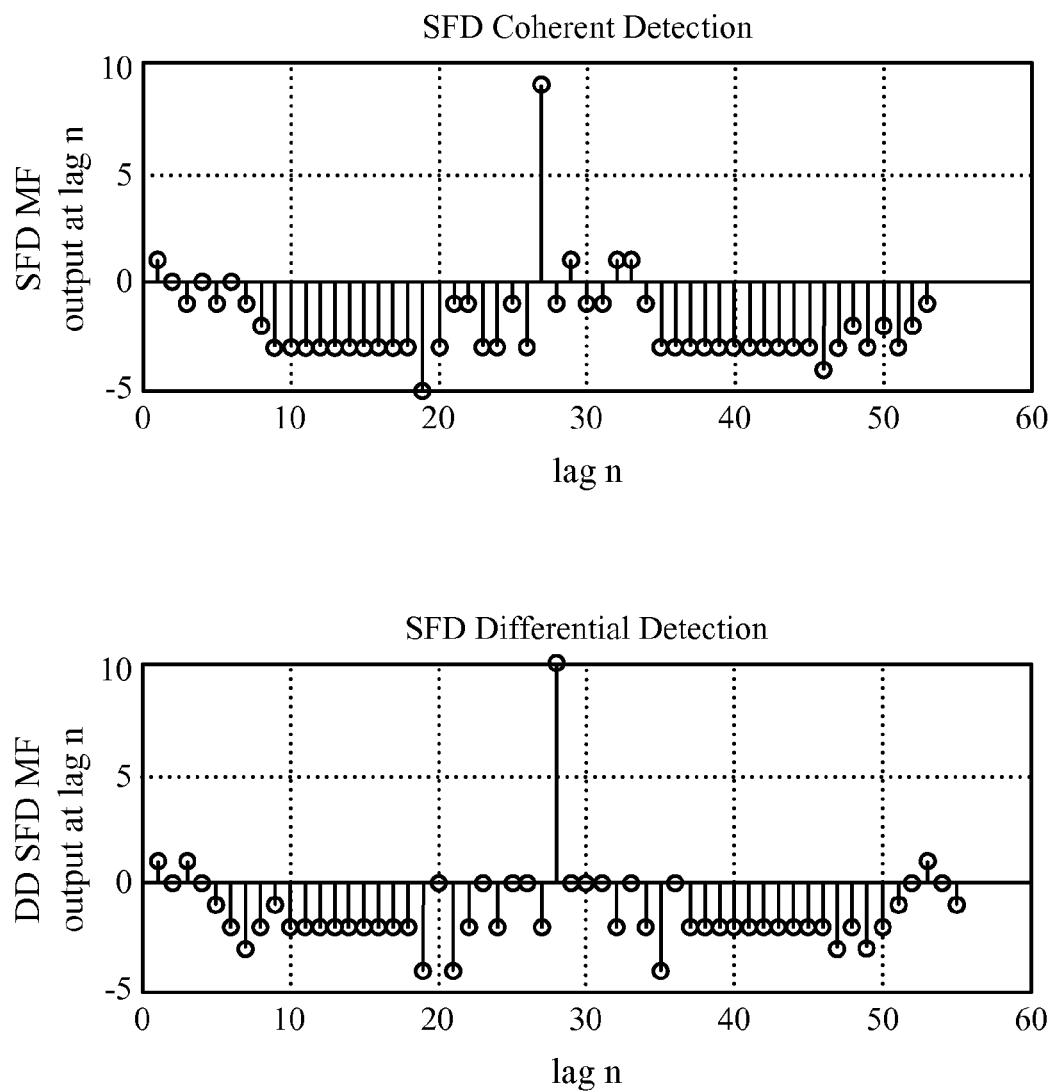
FIG. 11 illustrates correlations for a coherently detected Start Frame Delimiter (SFD) and for a differentially detected SFD from the LDR frame in accordance with certain aspects of the present disclosure.

FIG. 11 illustrates and compares correlations for a coherently detected SFD and a differentially detected SFD. It can be observed a low level of side-lobes in both cases. For certain aspects of the present disclosure, differential detection may be performed with a matched filter to one of the following three possibilities: SFD(2:9).×conj[SFD(1:8)] or SFD.×conj[SYNC(end) SFD(1:8)] or [SFD CES(1)]×[SYNC(end) SFD]. Therefore, in the first case, the following inner-product may be performed: SFD(2)·conj{SFD(1)}+SFD(3)·conj{SFD(2)}+ . . . +SFD(9)·conj{SFD(8)}. In the second case, the following inner-product may be performed: SFD(1)·conj{SYNC(end)}+SFD(2)·conj{SFD(1)}+ . . . +SFD(9)·conj{SFD(8)}. In the third case, the following inner-product may be performed: SFD(1)·conj{SYNC(end)}+SFD(2)·conj{SFD(1)}+ . . . +SFD(8)·conj{SFD(7)}+CES(1)·conj{SFD(8)}.

In one aspect of the present disclosure, the header 920 and signaling data 930 illustrated in FIGS. 9A-9B may be spread by the Barker code c of length 11 given as:

$$c=[-1 +1 -1 -1 +1 -1 -1 -1 +1 +1 +1]. \quad (3)$$

For certain aspects of the present disclosure, the header and signaling data may be encoded with a block code, such as a Low Density Parity Check (LDPC) code, a concatenated Hamming code (12,8) with a Reed-Solomon code, or a concatenated block code (16,8) with a Reed-Solomon code. In one aspect of the present disclosure, the following systematic Hamming code (12,8) generator matrix may be employed:

$$G = \begin{bmatrix} 1 & 0 & 0 & 0 & 0 & 0 & 0 & 0 & 1 & 0 & 0 & 1 \\ 0 & 1 & 0 & 0 & 0 & 0 & 0 & 0 & 1 & 0 & 1 & 1 \\ 0 & 0 & 1 & 0 & 0 & 0 & 0 & 0 & 0 & 1 & 1 & 1 \\ 0 & 0 & 0 & 1 & 0 & 0 & 0 & 0 & 0 & 1 & 0 & 1 \\ 0 & 0 & 0 & 0 & 1 & 0 & 0 & 0 & 1 & 0 & 1 & 0 \\ 0 & 0 & 0 & 0 & 0 & 1 & 0 & 0 & 1 & 1 & 0 & 1 \\ 0 & 0 & 0 & 0 & 0 & 0 & 1 & 0 & 0 & 1 & 1 & 0 \\ 0 & 0 & 0 & 0 & 0 & 0 & 0 & 1 & 1 & 1 & 0 & 0 \end{bmatrix}. \quad (4)$$

In another aspect of the present disclosure, the following systematic block code (16,8) generator matrix may be employed:

$$G = \begin{bmatrix} 1 & 0 & 0 & 0 & 0 & 0 & 0 & 0 & 1 & 1 & 0 & 1 & 0 & 1 & 0 \\ 0 & 1 & 0 & 0 & 0 & 0 & 0 & 0 & 0 & 1 & 1 & 0 & 1 & 0 & 1 \\ 0 & 0 & 1 & 0 & 0 & 0 & 0 & 1 & 0 & 0 & 1 & 1 & 0 & 1 & 0 \\ 0 & 0 & 0 & 1 & 0 & 0 & 0 & 0 & 1 & 0 & 0 & 1 & 1 & 0 & 1 \\ 0 & 0 & 0 & 0 & 1 & 0 & 0 & 1 & 0 & 1 & 0 & 0 & 1 & 1 & 0 \\ 0 & 0 & 0 & 0 & 0 & 1 & 0 & 0 & 1 & 0 & 1 & 0 & 0 & 1 & 1 \\ 0 & 0 & 0 & 0 & 0 & 0 & 1 & 0 & 1 & 0 & 1 & 0 & 1 & 0 & 0 & 1 \\ 0 & 0 & 0 & 0 & 0 & 0 & 0 & 1 & 1 & 1 & 0 & 1 & 0 & 1 & 0 & 0 \end{bmatrix}. \quad (5)$$

It should be appreciated that aspects of the present disclosure may employ various modulation schemes, including, but not limited to, differential phase shift key modulation and Gaussian minimum shift key modulation.

Figure 6A:
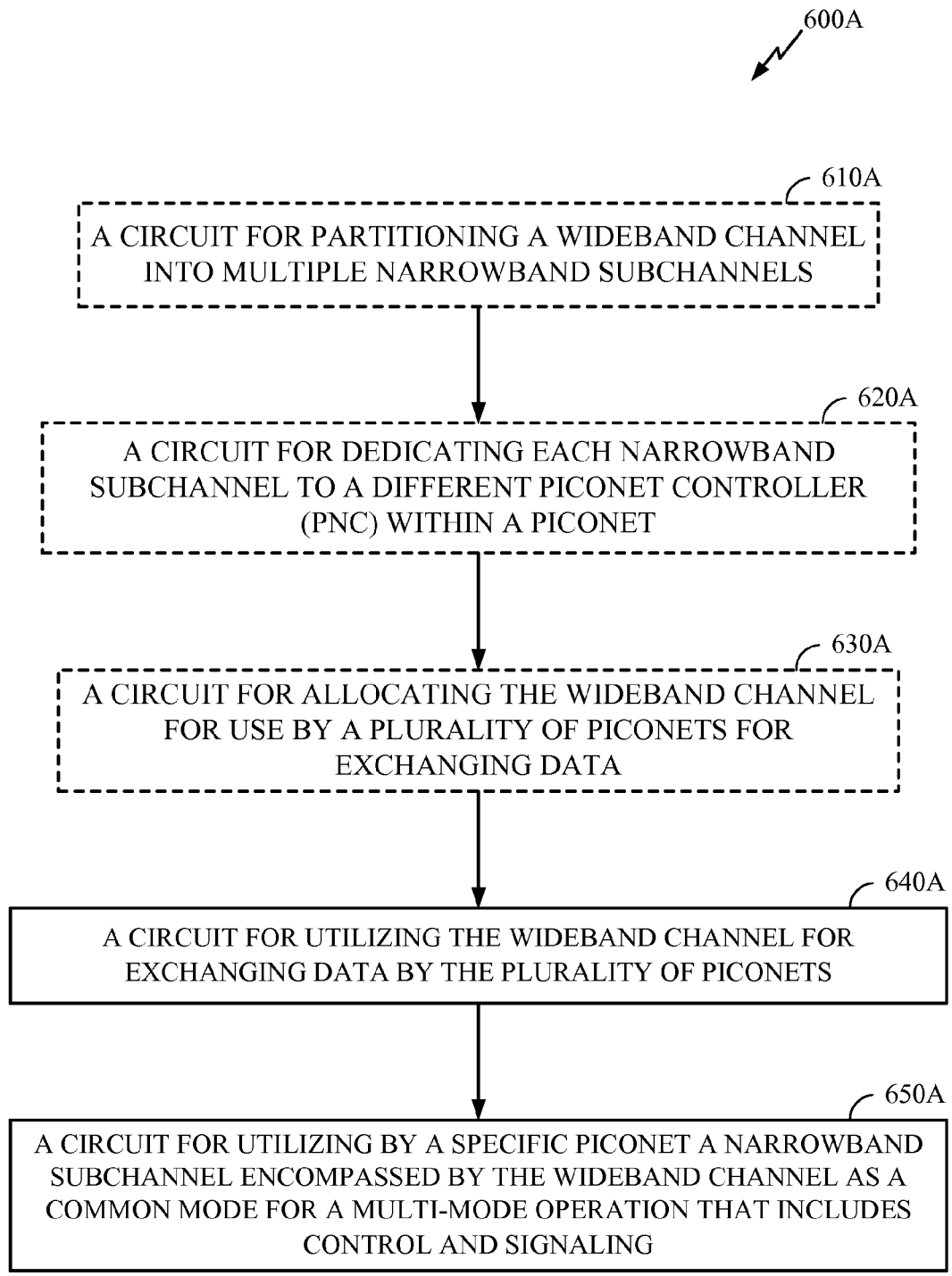
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 610-650 illustrated in FIG. 6 correspond to circuit blocks 610A-650A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, an access terminal, a personal digital assistant (PDA), a mobile handset, or other type of wireless device with processing logic and elements to perform the techniques provided herein.

The invention claimed is:

1. A method for wireless communications, comprising:
utilizing a wideband channel for communicating data within a first piconet, wherein the wideband channel is allocated for use by a plurality of piconets comprising the first piconet; and
utilizing a narrowband sub-channel encompassed by the wideband channel for communicating control information, wherein the narrowband sub-channel is dedicated for communicating control information in the first piconet.

2. The method of claim 1, wherein each narrowband sub-channel from a plurality of narrowband sub-channels encompassed by the wideband channel is dedicated for use by a unique piconet.

3. The method of claim 1, wherein:
the narrowband sub-channel encompassed by the wideband channel comprises a logical channel; and
utilizing the narrowband sub-channel comprises utilizing the logical channel by a piconet controller (PNC) in the first piconet for beaconing, association, channel time allocations (CTAs) and communicating Media Access Control (MAC) command messages.

4. The method of claim 1, wherein:
the narrowband sub-channel encompassed by the wideband channel comprises a logical channel; and
utilizing the narrowband sub-channel comprises utilizing the logical channel by a device in the first piconet for association, requesting a channel time allocation (CTA) period and signaling with a piconet controller (PNC) in the first piconet.

5. The method of claim 4, wherein utilizing the logical channel by the device comprises communicating with another device in the first piconet inside the CTA period using a single-carrier mode.

6. The method of claim 4, wherein utilizing the logical channel by the device comprises communicating with another device in the first piconet inside the CTA period using an Orthogonal Frequency Division Multiplexing (OFDM) mode.

7. The method of claim 1, wherein
the narrowband sub-channel encompassed by the wideband channel comprises a logical channel; and
utilizing the narrowband sub-channel comprises transmitting a frame over the logical channel, the frame comprising a preamble sequence, a header and signaling data.

8. The method of claim 7, wherein the preamble sequence comprises a channel estimation sequence (CES), a start frame delimiter (SFD), and a synchronization (SYNC) sequence.

9. The method of claim 8, wherein the SFD sequence and the SYNC sequence are spread by spreading codes.

10. The method of claim 7, wherein the header and the signaling data are spread by a spreading code.

11. The method of claim 7, wherein the header and the signaling data are encoded using a block code.

12. The method of claim 1, wherein:
the wideband channel has a bandwidth of approximately 2160 MHz and comprises five narrowband sub-channels; and
each narrowband sub-channel has a separation within the wideband channel of approximately 432 MHz.

13. The method of claim 1, wherein:
the wideband channel has a bandwidth of approximately 2160 MHz and comprises three narrowband sub-channels; and
each narrowband sub-channel has a 3 dB bandwidth of approximately 216 MHz.

14. An apparatus for wireless communications, comprising:
a circuit configured to utilize a wideband channel for communicating data within a first piconet, wherein the wideband channel is allocated for use by a plurality of piconets comprising the first piconet; and
a circuit configured to utilize a narrowband sub-channel encompassed by the wideband channel for communicating control information, wherein the narrowband sub-channel is dedicated for communicating control information in the first piconet.

15. The apparatus of claim 14, wherein each narrowband sub-channel from a plurality of narrowband sub-channels encompassed by the wideband channel is dedicated for use by a unique piconet.

16. The apparatus of claim 14, wherein:
the narrowband sub-channel encompassed by the wideband channel comprises a logical channel; and
the circuit configured to utilize the narrowband sub-channel comprises a circuit configured to utilize the logical channel by the apparatus in the first piconet for beaconing, association, channel time allocations (CTAs) and communicating Media Access Control (MAC) command messages.

17. The apparatus of claim 14, wherein:
the narrowband sub-channel encompassed by the wideband channel comprises a logical channel; and
the circuit configured to utilize the narrowband sub-channel comprises a circuit configured to utilize the logical channel by the apparatus in the first piconet for association, requesting a channel time allocation (CTA) period and signaling with a piconet controller (PNC) in the first piconet.

18. The apparatus of claim 17, wherein the circuit configured to utilize the logical channel by the apparatus comprises a circuit configured to communicate with another apparatus in the first piconet inside the CTA period using a single-carrier mode.

19. The apparatus of claim 17, wherein the circuit configured to utilize the logical channel by the apparatus comprises a circuit configured to communicate with another apparatus in the first piconet inside the CTA period using an Orthogonal Frequency Division Multiplexing (OFDM) mode.

20. The apparatus of claim 14, wherein
the narrowband sub-channel encompassed by the wideband channel comprises a logical channel; and
a circuit configured to utilize the narrowband sub-channel comprises a transmitter configured to transmit a frame over the logical channel, the frame comprising a preamble sequence, a header and signaling data.

21. The apparatus of claim 20, wherein the preamble sequence comprises a channel estimation sequence (CES), a start frame delimiter (SFD), and a synchronization (SYNC) sequence.

22. The apparatus of claim 21, wherein the SFD sequence and the SYNC sequence are spread by spreading codes.

23. The apparatus of claim 20, wherein the header and the signaling data are spread by a spreading code.

24. The apparatus of claim 20, wherein the header and the signaling data are encoded using a block code.

25. The apparatus of claim 14, wherein:
the wideband channel has a bandwidth of approximately 2160 MHz and comprises five narrowband sub-channels; and
each narrowband sub-channel has a separation within the wideband channel of approximately 432 MHz.

26. The apparatus of claim 14, wherein:
the wideband channel has a bandwidth of approximately 2160 MHz and comprises three narrowband sub-channels; and
each narrowband sub-channel has a 3 dB bandwidth of approximately 216 MHz.

27. An apparatus for wireless communications, comprising:
means for utilizing a wideband channel for communicating data within a first piconet, wherein the wideband channel is allocated for use by a plurality of piconets comprising the first piconet; and
means for utilizing a narrowband sub-channel encompassed by the wideband channel for communicating control information, wherein the narrowband sub-channel is dedicated for communicating control information in the first piconet.

28. The apparatus of claim 27, wherein each narrowband sub-channel from a plurality of narrowband sub-channels encompassed by the wideband channel is dedicated for use by a unique piconet.

29. The apparatus of claim 27, wherein:
the narrowband sub-channel encompassed by the wideband channel comprises a logical channel; and
the means for utilizing the narrowband sub-channel comprises means for utilizing the logical channel by the apparatus in the first piconet for beaconing, association, channel time allocations (CTAs) and communicating Media Access Control (MAC) command messages.

30. The apparatus of claim 27, wherein:
the narrowband sub-channel encompassed by the wideband channel comprises a logical channel; and
the means for utilizing the narrowband sub-channel comprises means for utilizing the logical channel by the apparatus in the first piconet for association, requesting a channel time allocation (CTA) period and signaling with a piconet controller (PNC) in the first piconet.

31. The apparatus of claim 30, wherein the means for utilizing the logical channel by the apparatus comprises means for communicating with another apparatus in the first piconet inside the CTA period using a single-carrier mode.

32. The apparatus of claim 30, wherein the means for utilizing the logical channel by the apparatus comprises means for communicating with another apparatus in the first piconet inside the CTA period using an Orthogonal Frequency Division Multiplexing (OFDM) mode.

33. The apparatus of claim 27, wherein
the narrowband sub-channel encompassed by the wideband channel comprises a logical channel; and
the means for utilizing the narrowband sub-channel comprises means for transmitting a frame over the logical channel, the frame comprising a preamble sequence, a header and signaling data.

34. The apparatus of claim 33, wherein the preamble sequence comprises a channel estimation sequence (CES), a start frame delimiter (SFD), and a synchronization (SYNC) sequence.

35. The apparatus of claim 34, wherein the SFD sequence and the SYNC sequence are spread by spreading codes.

36. The apparatus of claim 33, wherein the header and the signaling data are spread by a spreading code.

37. The apparatus of claim 33, wherein the header and the signaling data are encoded using a block code.

38. The apparatus of claim 27, wherein:
the wideband channel has a bandwidth of approximately 2160 MHz and comprises five narrowband sub-channels; and
each narrowband sub-channel has a separation within the wideband channel of approximately 432 MHz.

39. The apparatus of claim 27, wherein:
the wideband channel has a bandwidth of approximately 2160 MHz and comprises three narrowband sub-channels; and
each narrowband sub-channel has a 3 dB bandwidth of approximately 216 MHz.

40. A tangible computer-readable storage medium encoded with instructions executable to:
utilize a wideband channel for communicating data within a first piconet, wherein the wideband channel is allocated for use by a plurality of piconets comprising the first piconet; and
utilize a narrowband sub-channel encompassed by the wideband channel for communicating control information, wherein the narrowband sub-channel is dedicated for communicating control information in the first piconet.

41. An access point, comprising:
at least one antenna;
a transmitter configured to utilize a wideband channel for transmitting data via the at least one antenna within a first piconet, wherein the wideband channel is allocated for use by a plurality of piconets comprising the first piconet; and
a circuit configured to utilize a narrowband sub-channel encompassed by the wideband channel for transmitting control information via the at least one antenna, wherein the narrowband sub-channel is dedicated for communicating control information in the first piconet.

42. An access terminal, comprising:
at least one antenna;
a receiver configured to utilize a wideband channel for receiving data via the at least one antenna within a first piconet, wherein the wideband channel is allocated for use by a plurality of piconets comprising the first piconet; and
a circuit configured to utilize a narrowband sub-channel encompassed by the wideband channel for receiving control information via the at least one antenna, wherein the narrowband sub-channel is dedicated for communicating control information in the first piconet.

\* \* \* \* \*